United States Patent [19]

Hoffman et al.

[11] Patent Number: 4,934,129
[45] Date of Patent: Jun. 19, 1990

[54] METHOD OF AND APPARATUS FOR TRANSPORTING ARTICLES FROM A SUPPLYING TO A RECEIVING UNIT

[75] Inventors: Gottfried Hoffman; Olaf Buhrmester, both of Schwarzenbek; Herbert Bergner, Reinbek; Otto Blidung, Geesthacht, all of Fed. Rep. of Germany

[73] Assignee: Körber AG, Hamburg, Fed. Rep. of Germany

[21] Appl. No.: 254,190

[22] Filed: Oct. 5, 1988

[30] Foreign Application Priority Data

Oct. 16, 1987 [DE] Fed. Rep. of Germany ..... 37350404

[51] Int. Cl.⁵ ...................... B65B 35/30; B65B 35/52; B65B 57/14
[52] U.S. Cl. ........................................ 53/443; 53/496; 53/447
[58] Field of Search .................... 53/443, 447, 496, 57, 53/73, 531, 541; 148/433, 418.5, 426, 429, 430

[56] References Cited

U.S. PATENT DOCUMENTS 4,258,527 3/1981 Steinbrecher .................... 53/448 X
4,537,550 8/1985 Mojden .................. 53/541

Primary Examiner—John Sipos
Attorney, Agent, or Firm—Peter K. Kontler

[57] ABSTRACT

Packets of cigarettes are delivered from a packing machine to a cartoner in the form of arrays each of which contains a predetermined number of packets. The packing machine discharges discrete packets which are advanced to a gathering station where the packets are assembled into arrays in successive compartments of a stepwise operated first endless conveyor. The first conveyor delivers freshly accumulated arrays into the pockets of a stepwise operated second endless conveyor which delivers a series of arrays to a second station adjacent the cartoner. The second conveyor is set in motion during a first stage of each cycle of the cartoner, and a pusher transfers successive arrays from the respective pockets of the second conveyor during second stages of certain cycles of the cartoner. The frequency of cycles of the cartoner at least equals but normally exceeds of the frequency at which arrays of packets are assembled in the compartments of the first conveyor. In order to compensate for such discrepancy, the accumulation of packets into arrays at the gathering station is monitored and the second conveyor is caused to advance by a step without receiving an array from the first conveyor when the monitoring step indicates that the accumulation of a fresh array cannot be completed prior to completion of a preselected portion of the corresponding cycle of the cartoner.

23 Claims, 3 Drawing Sheets

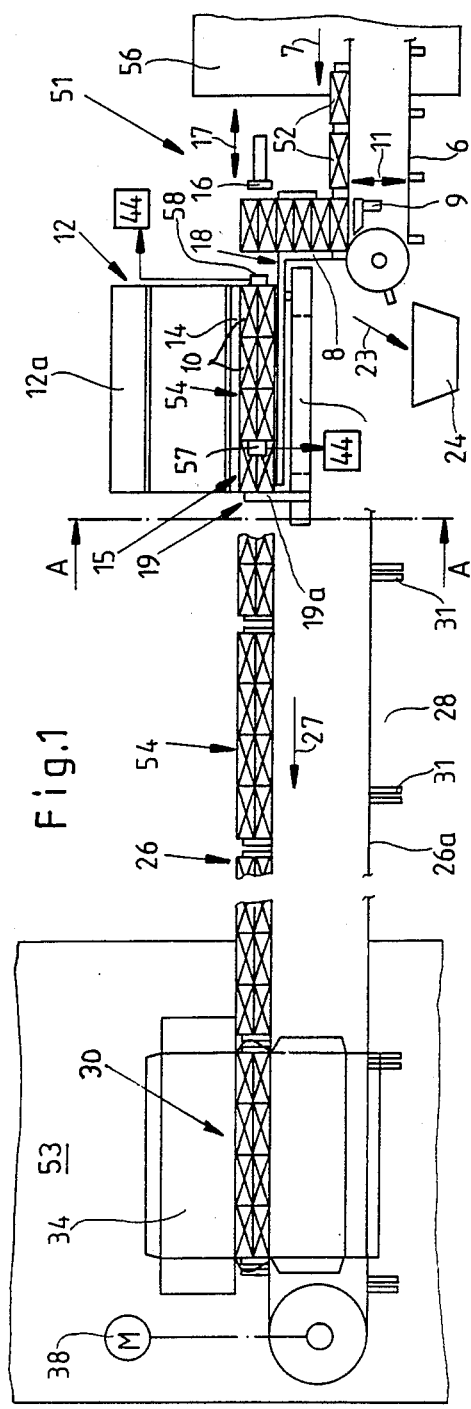
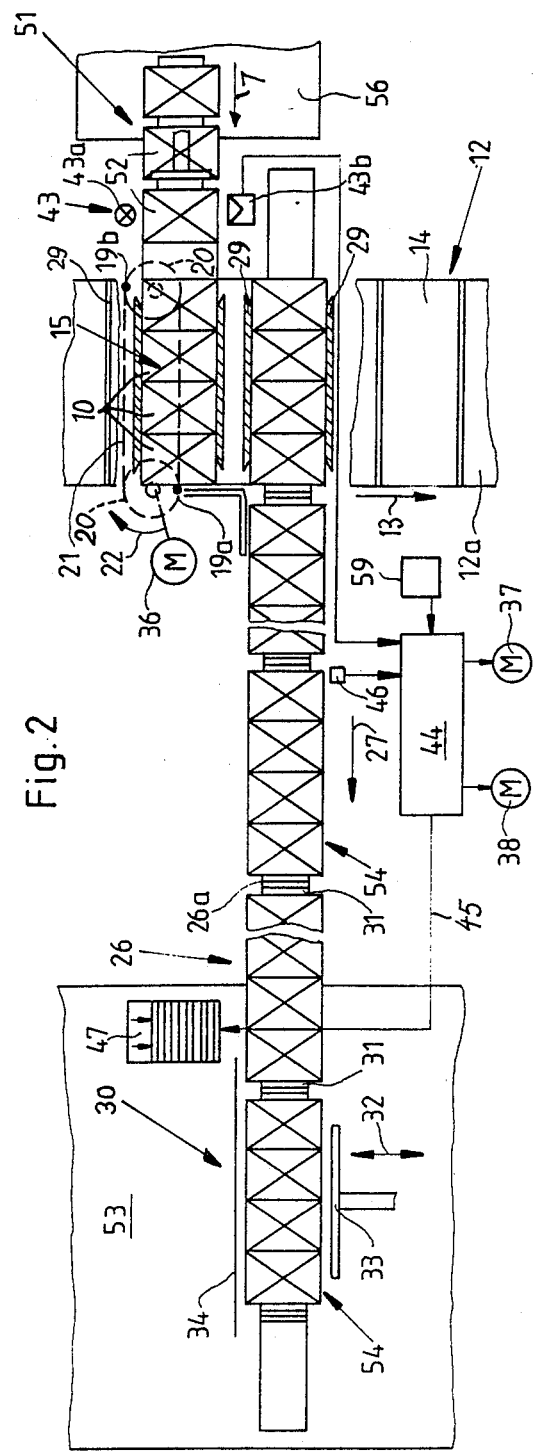

METHOD OF AND APPARATUS FOR TRANSPORTING ARTICLES FROM A SUPPLYING TO A RECEIVING UNIT

CROSS-REFERENCE TO RELATED CASE

The method and apparatus of the present invention are similar to those disclosed in the commonly owned copending patent application Ser. No. 254,173 filed Oct. 5, 1988 by Herbert Bergner and Otto Blidung for "Method of and apparatus for assembling and wrapping arrays of cigarette packets and the like".

BACKGROUND OF THE INVENTION

The invention relates to a method of and to an apparatus for assembling discrete articles into arrays wherein the articles are distributed in a predetermined formation, and for manipulating the arrays. More particularly, the invention relates to improvements in methods of and in apparatus for transporting articles (such as packets of cigarettes or other smokers' products) from a supplying unit (such as a cellophaning machine) to a receiving unit, e.g., to a cartoner.

It is often necessary to couple a supplying unit, which delivers discrete articles, with a receiving or processing unit which must manipulate arrays of articles. The establishment of a reliable link or coupling between such units presents many problems, especially if the output of the supplying unit does not match the requirements of the receiving unit. For example, the requirements of a receiving unit will exceed the output of the supplying unit if the supplying unit is temporarily operated at less than nominal speed, if it is necessary to segregate defective articles from the path which leads from the supplying unit to the receiving unit and/or if the output of the supplying unit is less than the output of the receiving unit even while the supplying unit is operated at full speed. As a rule, presently known apparatus for coupling such supplying and receiving units employ magazines which contain groups of spare articles and serve to deliver spare articles when the output of the supplying unit cannot meet the requirements of the receiving unit, or to accept a portion of the output of the supplying unit if such output exceeds the requirements of the receiving unit. The magazines contribute to the bulk, initial and maintenance cost of the production line.

OBJECTS OF THE INVENTION

An object of the invention is to provide a novel and improved method of transporting articles between a supplying and a receiving unit in such a way that a magazine is not necessary even if the output of the supplying unit does not match the requirements of the receiving unit.

Another object of the invention is to provide a novel and improved method of manipulating packets of cigarettes or like articles on their way from a cellophaning machine to a cartoner.

An additional object of the invention is to provide a novel and improved method of gathering arrays of packets of cigarettes or other articles during transport of articles between the supplying and receiving units.

A further object of the invention is to provide a production line which includes a supplying unit, a receiving unit and an apparatus which transports and manipulates articles between the supplying and receiving units.

Still another object of the invention is to provide an apparatus which renders it possible to directly couple a supplying unit with a receiving unit whose requirements exceed the output of the supplying unit.

A further object of the invention is to provide the apparatus with novel and improved means for gathering articles into arrays during transport from the supplying unit to the receiving unit.

Another object of the invention is to provide the apparatus with novel and improved means for controlling the operation of means for transporting articles between the supplying unit and the receiving unit.

An additional object of the invention is to provide novel and improved conveyors for use in the above outlined apparatus.

A further object of the invention is to provide the apparatus with novel and improved means for compensating for differences between the output of the supplying unit and the requirements of the receiving unit.

Another object of the invention is to provide an apparatus which need not embody or cooperate with one or more magazines for spare articles and/or superfluous articles.

A further object of the invention is to provide an apparatus which can be installed between existing supplying and receiving units as a superior substitute for heretofore known apparatus.

An additional object of the invention is to provide the apparatus with novel and improved means for automating the transport of articles between the supplying and receiving units.

SUMMARY OF THE INVENTION

One feature of the present invention resides in the provision of a method of transporting articles (such as packets of smokers' products) from a supplying unit (such unit can include a machine for draping packets into light-transmitting envelopes) to a receiving unit (the receiving unit can include a wrapping machine, particularly a cartoner) which carries out successive working cycles at a predetermined (first) frequency. The method comprises the steps of advancing articles from the supplying unit to a first station, gathering predetermined numbers of advanced articles into a series of arrays of articles at the first station, conveying the arrays of the series of arrays from the first station toward a second station during first stages of successive cycles of the receiving unit, and transferring discrete arrays from the second station to the receiving unit during second stages of successive cycles of the receiving unit.

The gathering steps are carried out at a second frequency which at most equals the predetermined or first frequency, and each conveying step includes transporting the arrays from the first toward the second station during the first stage of each cycle of the receiving unit irrespective of whether or not the conveying step results in the delivery of an array to the second station. Successive conveying steps can take place during different portions of first stages of successive cycles.

The method can further comprise the steps of monitoring the relationship of timing of advancing steps and/or certain stages of gathering steps with reference to the cycles of the receiving unit, and initiating each conveying step within the first stage of the respective cycle as a function of such relationship. Each gathering step takes up an interval of time which involves conversion of the predetermined number of articles into constituents of the respective array, and the monitoring step can include monitoring the conversion of selected article or articles of each predetermined number of articles into a corresponding constituent of the respective array. For example, the monitoring step can include monitoring the conversion of penultimate articles of the predetermined numbers of articles into the corresponding constituents of the respective arrays. The conveying steps include transporting the arrays relative to the articles which are in the process of being gathered into an array at the first station when the conversion of the penultimate article of a predetermined number of articles into a constituent of the array which is being gathered at the first station coincides with a predetermined portion of the respective cycle.

A conveying step is carried out during the first stage of each cycle of the receiving unit. Each conveying step can include transporting arrays from the first station toward the second station in the pockets of a conveyor, and the method further comprises the steps of delivering arrays from the first station into the pockets of the conveyor. Each delivering step can immediately follow completion of a gathering step and normally precedes a conveying step. However, if the aforementioned monitoring step indicates that the gathering of an array at the first station is not likely to be completed within a predetermined portion of the respective cycle, the conveying step is carried out prior to the delivering step, i.e., the conveyor is caused to move relative to the first station and relative to the array which is being gathered at the first station even though this results in the formation of a gap (absent array) in the path of movement of arrays from the first toward the second station. Otherwise stated, the conveyor is caused to carry out two successive steps without receiving an array at the first station between such successive steps if the monitoring step indicates that the timing of completion of an array at the first station is outside of the predetermined portion of the respective cycle of the receiving unit. Each cycle includes the aforementioned predetermined portion and a second portion following the predetermined portion an involving an interval of time which is required to complete the gathering of an array at the first station and the delivery of the thus completed array into a pocket of the conveyor.

The advancing step includes transporting articles from the supplying unit toward the first station along a predetermined path, and the method preferably further comprises the step of monitoring the path for the presence or absence of articles. The conveying step includes transporting the arrays relative to the articles which are being gathered into an array at the first station when the monitoring step indicates the absence of articles in the path, i.e., the conveying step then involves the making of a gap (array missing) in the path which extends from the first station toward the second station.

Another feature of the invention resides in the provision of an apparatus for transporting articles (such as the aforementioned packets of smokers' products) from a supplying unit to a receiving unit which carries out successive working cycles at a first frequency. The apparatus comprises means defining a first station and a second station which is remote from the first station and is or can be adjacent the receiving unit, means for advancing articles from the supplying unit to the first station, means for gathering predetermined numbers of advanced articles into a series of arrays at the first station at a second frequency, intermittently operated conveyor means for advancing the series of arrays from the first station toward the second station during first stages of successive cycles of the receiving unit, and means for transferring discrete arrays from the second station to the receiving unit during second stages of the cycles. The first frequency equals or exceeds the second frequency, and the apparatus further comprises means (e.g., a variable-speed electric motor) for driving the conveyor means during the first stage of each cycle of the receiving unit so that the conveyor means advances at times relative to the articles which are being gathered into an array at the first station when the first frequency exceeds the second frequency.

The apparatus can further comprise means for monitoring the second frequency and control means for starting the driving means in response to signals from such monitoring means. The monitoring means can include means for generating signals in response to detection of penultimate articles of successive predetermined numbers of articles which are in the process of being gathered into an array at the first station. The driving means is then arranged to move the conveyor means by a step relative to the articles which are in the process of being gathered into an array at the first station when the monitoring means generates a signal during a predetermined portion of the respective cycle. The control means can include a potentiometer or another suitable source of reference signals denoting the predetermined portions of the cycles.

The conveyor means can include an endless conveyor with pockets for discrete arrays and the gathering means can include second conveyor means for articles which are gathered into arrays and means for driving the second conveyor means so as to deliver successively gathered arrays into the pockets of the endless conveyor prior to stepwise advancement of arrays by the endless conveyor. The aforementioned monitoring means ensures that the endless conveyor is driven by a step before it receives an array from the second conveyor means when the signal from the monitoring means indicates that the conversion of selected article (e.g., the penultimate article) of a predetermined number of articles is not completed within the aforementioned predetermined portion of the respective cycle.

The apparatus can further comprise a photoelectronic detector or other suitable means for monitoring the advancing means and for generating signals in response to detected absence of articles in the path between the supplying unit and the first station. Such signals are used by the control means for influencing the driving means for the endless conveyor so that the latter carries out an idle step which precedes the delivery of an array from the second conveyor means into a pocket of the endless conveyor.

As mentioned above, the receiving unit can include a wrapping machine (such as a cartoner) for arrays. The articles can include packets of cigarettes or other smokers' products, and the supplying unit can include a machine (e.g., a cellophaning machine) for draping packets into light-transmitting envelopes.

The gathering means can include means for gathering pairs of packets into the aforementioned series of successive arrays.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary schematic side elevational view of an apparatus which embodies one form of the invention and constitutes a coupling or link between a supplying unit for packets of smokers' products and a receiving unit wherein arrays of packets are converted into cartons each of which contains eight packets;

FIG. 2 is a partly plan and partly horizontal sectional view of the apparatus which is shown in FIG. 1;

DESCRIPTION OF PREFERRED EMBODIMENTS

Figure 3:
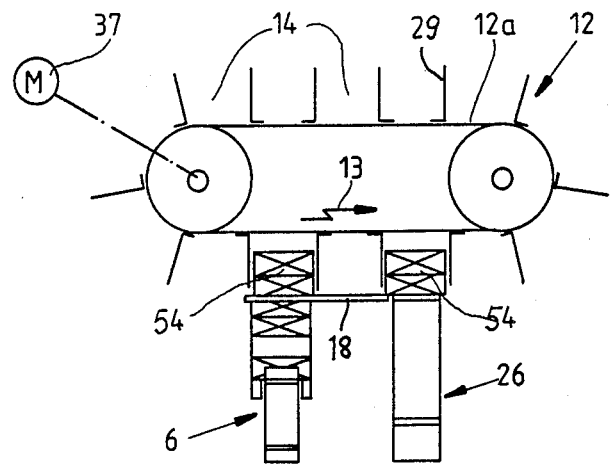
FIG. 3 is a transverse sectional view as seen in the direction of arrows from the line A—A of FIG. 1.

The apparatus which is shown in FIGS. 1, 2 and 3 constitutes a coupling or link between a supplying unit 51 and a receiving unit 53. The unit 51 includes a source 56 of discrete articles in the form of cigarette packets 52 which are discharged in the direction of arrow 7 and are advanced by an endless cleated belt conveyor 6 toward a first (gathering) station 15. The apparatus includes means for gathering predetermined numbers (eight) of packets 52 into arrays 54, and the receiving unit 53 constitutes a machine (such as a cartoner) wherein successive arrays 54 are draped into blanks 34. The source 56 can constitute a cellophaning machine wherein cigarette packets issuing from a cigarette packing machine are wrapped into envelopes consisting of light-transmitting material in a manner not forming part of the present invention. A suitable cellophaning machine is that known as C 90 which is manufactured and distributed by the assignee of the present application. If the receiving unit 53 is or includes a cartoner, it can be of the type known as B 90 (manufactured and distributed by the assignee of the present application). Reference may also be had to commonly owned U.S. Pat. No. 4,653,248 granted Mar. 31, 1987 to Herbert Bergner et al. for "Apparatus for making cartons of cigarette packs and the like".

The upper reach of the cleated advancing conveyor 6 delivers successive packets 52 of a row or file of equidistant packets into the range of an elevator 9 which is movable up and down in directions indicated by a double-headed arrow 11 so as to introduce successive packets 52 into the lower end of an upright tower or duct 8 which is adjacent the gathering station 15.

The gathering means of the improved apparatus comprises an endless conveyor 12 having an endless band 12a supporting a set of equidistant partitions 29 which define a series of elongated compartments 14 each arranged to confine a full array 54 of eight properly distributed packets 52. Each array 54 comprises two superimposed rows of four packets 52 each. Otherwise stated, each array comprises four identical constituents 10 in the form of pairs of superimposed packets 52. The gathering means further comprises a reciprocable pusher 16 which is movable in directions indicated by a double-headed arrow 17 and is designed to transfer successive pairs of topmost packets 52 from the upper end of the turret or duct 8 into the adjacent compartment 14 of the conveyor 12. The means for driving the conveyor 12 in stepwise fashion comprises a variable-speed electric motor 37 or another suitable prime mover which can be started and arrested by a control circuit 44. The direction of transfer of pairs of packets 52 from the turret or duct 8 into the adjacent compartment 14 of the conveyor 12 is parallel to the direction of advancement of packets 52 with the upper reach of the advancing conveyor 6 and extends at right angles to the direction of advancement of packets 52 in the interior of the duct 8. The direction in which the motor 37 can advance the conveyor 12 in stepwise fashion is indicated by the arrow 13 (see also FIG. 3). The gathering means 12, 16 carries out a series of successive working cycles TF (FIG. 4) each of which includes four stages ZT, namely four successive forward strokes of the pusher 16 so as to convert a total of eight packets 52 into four constituents 10 of the array 54 which is gathered in the adjacent compartment 14 of the conveyor 12. As a rule, an array will consist of five constituents 10, i.e., it will contain ten packets 52. This will be described in detail with reference to FIG. 4. However, the method of gathering or assembling packets 52 into arrays 54 of ten packets (five constituents 10) each is the same as the method of gathering arrays of eight packets each; the only difference is that the smaller arrays require smaller blanks 34 in the receiving unit 53, that the dimensions of compartments 14 between the partitions 29 of the conveyor 12 are different and that four successive forward strokes of the pusher 16 suffice to gather a full array of eight packets.

The means which defines the gathering station 15 includes a platform or track 18 along which the pusher 16 can advance pairs of superimposed packets 52 into the adjacent compartment 14 of the conveyor 12. In order to ensure predictable gathering of packets 52 into a series of arrays 54, the apparatus further comprises an aligning device 19 (hereinafter called aligner) which includes an endless toothed belt conveyor 21 and two spaced-apart stops 19a, 19b which are affixed to and share the intermittent movements of the conveyor 21. The latter is trained over two pulleys 20 and is intermittently driven by a motor 36 so as to advance in the direction of arrow 22.

The aligner 19 cooperates with the pusher 16 in the following way: When the pusher 16 is about to perform the first of four successive forward strokes in order to deliver into an empty compartment 14 the first constituent 10 of an array 54, the stop 19a or 19b is located at the right-hand end (as viewed in FIGS. 1 and 2) of such empty compartment 14 and shares the forward (leftward) movement of the first constituent 10 into the interior of the respective compartment 14. The same procedure is repeated three more times whereby the stop 19a or 19b moves with the growing array 54 in the compartment 14 to ultimately reach a position corresponding to that of the stop 19a shown in FIGS. 1 and 2. The motor 36 thereupon causes conveyor 21 to carry out a step in the direction of arrow 22 so as to place the other stop 19b in front of the next (empty) compartment 14 of the conveyor 12. This conveyor has been caused to carry out a step in the direction of arrow 13 so that the compartment 14 containing the freshly gathered array is moved away from a position of alignment with the pusher 16 and the latter then registers with the inlet end of the foremost empty compartment 14 of the conveyor 12. The stop 19a or 19b which abuts the foremost constituent 10 of a growing array 54 can be pushed forwardly by the growing array or the conveyor 21 is driven by the motor 36 in sychronism with forward strokes of the pusher 16, always through a distance corresponding to the width of a constituent 10 (as seen in the longitudinal direction of the compartment 14 which then registers with the pusher 16). It has been found that the aligner 19 contributes significantly to predictable gathering of packets 52 into arrays 54 each of which has a predetermined size and shape.

The apparatus further comprises means for monitoring the condition of packets 52 on the conveyor 6 or in the source 56. Detection of a defective packet 52 results in transmission of an appropriate signal to the means for moving the elevator 9 in the directions of arrow 11 so that the elevator 9 is held in the lower end position and permits the conveyor 6 to advance the defective packet 52 beneath the duct or turret 8 and to discharge the defective packet in the direction of arrow 23 so that the defective packet enters a collecting receptacle 24. Means for monitoring packets of cigarettes and for generating signals in response to detection of defective packets are well known in the tobacco processing industry and are described in numerous United States and foreign patents of the assignee of he present application.

Figure 4:
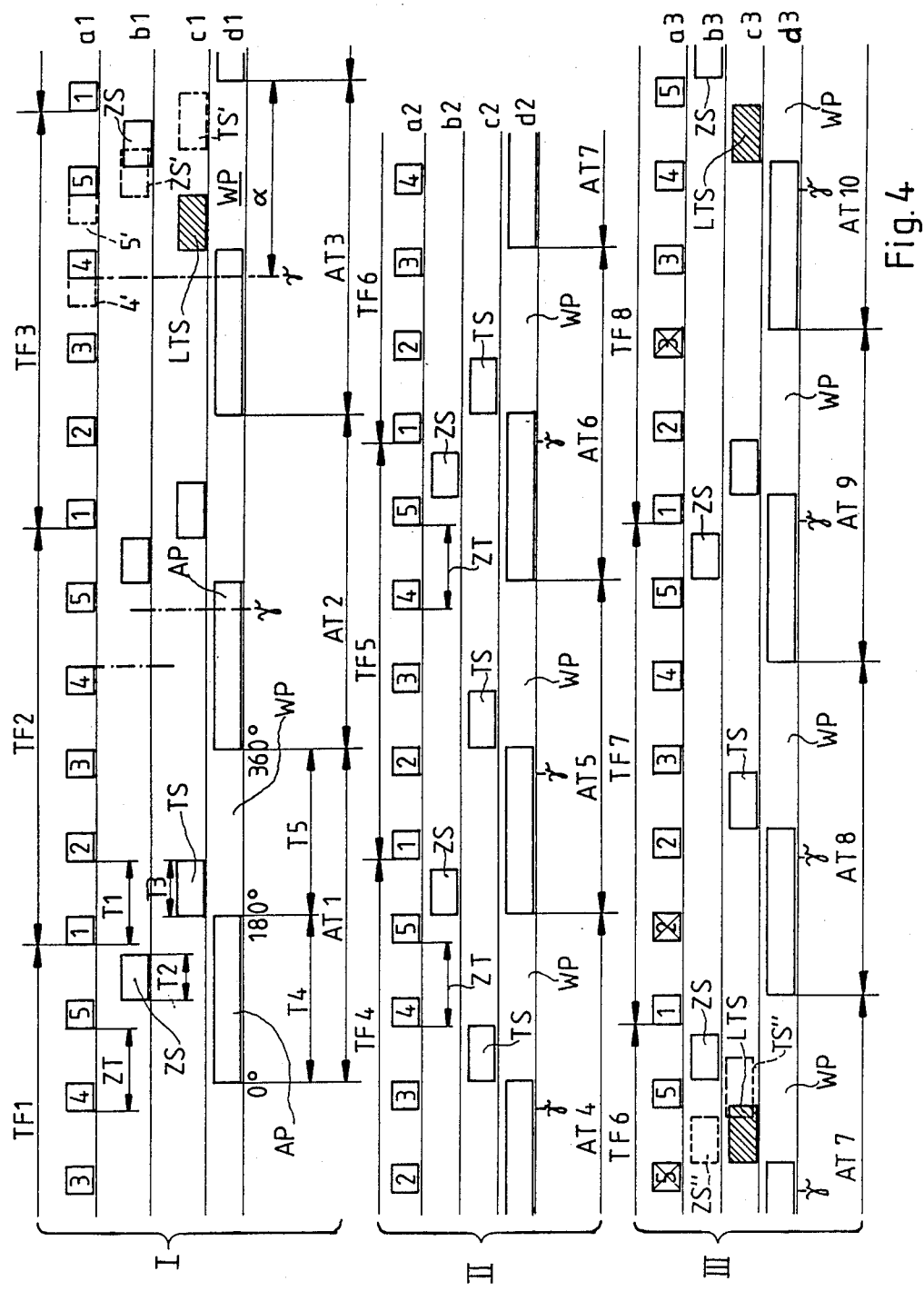
FIG. 4 is a diagram showing the operation of a modified apparatus wherein the gathering means is designed to assemble arrays of ten packets each.

When the gathering of an array 54 at the station 15 is completed, the motor 37 causes the conveyor 12 to carry out a step in the direction of arrow 13 whereby the freshly grown array moves along the platform 18 and enters the adjacent empty pocket 28 of a second endless conveyor 26 which has an endless belt 26a and partitions 31 bounding the pockets 28. The means for driving the conveyor 26 in stepwise fashion in the direction of arrow 27 includes a variable-speed electric or other suitable motor 38 which receives start and stop signals from the control circuit 44. The steps which are carried out by the conveyor 12 in order to deliver successive fully grown arrays 54 into the adjacent pockets 28 of the conveyor 28 are shown in FIG. 4, as at ZS.

The conveyor 26 defines an elongated path which extends at right angles to the path of movement of the conveyor 12 and serves to transport a series of arrays from the gathering station 15 toward a second station 30 which is defined adjacent the receiving unit 53. The paths of the conveyors 12, 26 cross each other at the platform 18, and the arrangement is such that the motor 37 is idle when the motor 38 is caused to advance the conveyor 26 by a step and vice versa. Each step of the conveyor 12 normally results in the delivery of an array 54 from a filled compartment 14 into an empty pocket 28, and each step of the conveyor 26 in the direction of arrow 27 results in stepwise advancement of a series of successive arrays 54 in the pockets 28 of the conveyor 26 from the station 15 toward the station 30. The configuration of the arrays 54 in the pockets 28 remains unchanged during stepwise conveying toward the station 30.

The device for transferring successive foremost or first arrays 54 on the upper reach of the conveyor 26 from the station 30 into the receiving unit 53 comprises a pusher 33 which is reciprocable in directions indicated by a double-headed arrow 32 and serves to engage the transferred array 54 with the blank 34 which is maintained in a position of readiness in the receiving unit 53 so that it can be folded around the array as soon as the transferring step is completed. Blanks 34 are stored in the magazine of a blank supplying device 47, and selected portions of each blank are normally provided with coats of a suitable adhesive on their way from the device 47 toward positions of register with the transferring device 33. The device 33 is caused to transfer an array from the adjacent pocket 28 of the conveyor 26 into the receiving unit 53 during a stage AP (see FIG. 4) of each working cycle AT of the receiving unit 52, and the motor 38 is caused to advance the conveyor 26 by a step during a stage WP (FIG. 4) of each cycle AT. The receiving unit 53 comprises customary folding, tucking and other suitable instrumentalities which convert successive blanks 34 into boxes confining the respective arrays 54 and forming therewith customary commodities known as cartons. Reference may be had again to the aforementioned U.S. Pat. No. 4,653,248.

The elements of the means for intermittently moving the advancing conveyor 6, for reciprocating the elevator 9, for reciprocating the pusher 16 and for reciprocating the transferring device 33 are not specifically shown in the drawing. Such elements can include cams and followers. The arrangement is preferably such that the conveyor 6, the elevator 9 and the pusher 16 derive motion from the prime mover of the source 56. The conveyor 21 of the aligner 19 is driven by the aforementioned motor 36, and the conveyors 12, 26 are respectively driven by the motors 37, 38 which are connected with the control circuit 44. The motor 36 is idle when the pusher 16 is idle, i.e., when the compartment 14 which registers with the pusher 126 does not receive constituents 10 of an array 54. The transferring device 33 can receive motion from the prime mover of the receiving unit 53.

The diagram of FIG. 4 represents the mode of operation of a slightly modified apparatus during ten successive cycles AT1 to AT10 of the receiving unit 53. The cycles AT1 to AT10 are shown in lines d1, d2 and d3 of the respective sections I, II, III of the diagram which is to be read in a direction from the left-hand end of the section I toward the right-hand end of the section III. Each cycle AT is assumed to cover a phase angle of 360 degrees and involves an interval of time during which the endless conveyor 26 is advanced by a step TS and the transferring device 33 moves from the retracted position of FIG. 2 to the extended position and back to the retracted position i.e., each such cycle normally involves conveying a fresh array 54 to the station 30 and transferring the thus conveyed array 54 into the range of folding instrumentalities in the receiving unit 53 or the transferring of an array 54 from the station 30 into the receiving unit 53 and subsequent conveying of a next-following array to the station 30. Each cycle AT includes a stage AP which takes up an interval T4 and during which the transferring device 33 performs a forward and return stroke to thereby transfer an array 54 from the station 30 into the receiving unit 53, and a stage WP which takes up an interval T5 and during a portion of which the conveyor 26 is caused to perform a step TS so as to advance a fresh array 54 to the station 30 or to move an empty pocket 28 into register with the transferring device 30, depending upon whether or not the path which extends between the stations 15 and 30 contains one or more empty pockets 28. The transferring device 33 dwells in the retracted position of FIG. 2 during each stage WP so as not to interfere with stepwise movements of the conveyor 26.

The receiving unit 53 is preferably operated at a constant speed, i.e., the duration of the first cycle AT1 is the same as that of the second cycle AT2, and so forth. However, it is possible to alter the speed of the receiving unit 53, i.e., the frequency of cycles AT can be increased or reduced. FIG. 4 shows that the intervals of time taken up by the ten represented cycles AT1 to AT10 are identical.

The means (including the pusher 16 and the conveyor 12) for gathering predetermined numbers (ten in FIG. 4) of packets 52 into a series of arrays 54 is operated cyclically, and each stage ZT of a complete cycle TF of such gathering means takes up an interval T1 (this is shown in lines a1, a2 and a3 of the diagram of FIG. 4). The frequency of cycles TF at which the pusher 16 and the conveyor 12 can gather a complete array 54 having five pairs of superimposed packets 52 (as is customary in the United States) at most equals and is normally or often less than the frequency of cycles AT of the receiving unit 53. Each cycle TF includes five identical stages ZT, and the duration of each cycle TF is five times T1. The duration of each cycle AT is T4+T5. The reference numerals 10 denote in FIGS. 1 and 2 discrete constituents of an array 54, and each such constituent comprises two superimposed packets 52. The difference between the arrays 54 which are shown in FIGS. 1-3 and the arrays which are manipulated in a manner as described with reference to FIG. 4 is that the latter arrays contain five constituents 10 each, i.e., a total of ten packets 52. The numerals 1, 2, 3, 4, 5 in lines a1, a2 and a3 of the diagram of FIG. 4 denote successive constituents 10 of successively gathered arrays 54 each of which contains a total of ten packets 52.

When the gathering means including the conveyor 12 and the pusher 16 has completed the gathering of ten packets 52 (five constituents 10) into a full array 54, the conveyor 12 is caused to perform a step ZS (note the lines b1, b2 and b3 of the diagram of FIG. 4) so as to move the freshly gathered array 54 along the platform 18 and into the adjacent empty pocket 28 of the conveyor 26. Each step ZS of the conveyor 12 takes up an interval T2, and each such step normally precedes advancement of the conveyor 26 by a step TS so as to place a fresh array 54 into register with the transferring device 33 at the station 30. The steps ZS are necessary in order to ensure that the station 15 is evacuated and the pusher 16 is free to cooperate with the stop 19a or 19b of the aligner 19 in order to proceed with the gathering of the next array 54, i.e., to proceed with the conversion of ten successively advanced packets 52 into five constituents 10 of the next array, as soon as the gathering of the preceding array 54 is completed.

When the conveyor 12 has completed a step ZS, the conveyor 26 performs a step TS (note the lines c1, c2 and c3 of the diagram of FIG. 4), and each such step TS takes up an interval T3. As mentioned above, this results in delivery of the foremost array 54 on the conveyor 26 to the station 30 and into a position of register with the transferring device 33. At the same time, an empty pocket 28 is moved to requisite position at the station 15 so that it can receive the next (freshly gathered) array 54 from the conveyor 12.

FIG. 4 shows that the conveyor 12 carries out a first step ZS during the stage AP of the first cycle AT1 of the receiving unit 53, i.e., during that stage when the transferring device 33 is in the process of carrying out a forward and a return stroke and the conveyor 26 is at a standstill. The step TS is performed by the conveyor 26 with a certain delay following completion of the step ZS, namely during the stage WP of the first cycle AT1 of the receiving unit 53. This is necessary in order to ensure that the conveyor 26 is not in motion at a time when its movement could interfere with forward and return strokes of the transferring device 33 and vice versa. The illustrated first step TS is carried out during the first portion of the stage WP of the cycle AT1, i.e., in good time before the transferring device 33 is caused to carry out its next forward stroke and to thereby transfer a full array 54 from the station 30 into the receiving unit 53. At the same time, the pusher 16 cooperates with the conveyor 12 to gather a fresh array 54 at the station 15. The cycle TF2 of the gathering means 12, 16 begins before the conveyor 26 is caused to perform the step TS during the stage WP of the first cycle AT1.

Under ideal circumstances, the output of the supplying unit 51 matches the requirements of the receiving unit 53. The duration of each cycle TF (of the gathering means 12, 16) then matches the duration of each cycle AT (of the receiving unit 53), i.e., the operation of the supplying unit 51 and gathering means 12, 16 is synchronized with the operation of the receiving unit 53. This means that the timing of stages ZT (five of which form a cycle TF) with reference to the steps TS of the conveyor 26 remains unchanged. Otherwise stated, the delay with which the conveyor 26 performs a step TS (in order to advance the foremost array 54 to the station 30) following the completion of a cycle TF is always the same. Under such ideal circumstances, conveying of successive arrays 54 into the range of the transferring device 33 presents no problems, i.e., the operation of the improved apparatus (which can be said to constitute a direct coupling between the units 51 and 53) is relatively simple and the apparatus can employ rudimentary controls.

However, in actual practice, the requirements of the receiving unit 53 hardly ever match the output of the supplying unit 51. In order to render it possible to establish a direct coupling between the units 51 and 53 even if the output of the unit 51 does not match the requirements of the receiving unit 53, the output of the unit 51 and/or the output of the unit 53 is selected in such a way that the requirements of the unit 53 exceed or, at the very least, match the output of the unit 51. Furthermore, the apparatus operates in such a way that it is not necessary to establish and maintain a substantial reservoir of spare arrays 54 for insertion into the path between the stations 15 and 30 in spite of the fact that the output of the unit 51 at most matches the requirements of the unit 53. This is achieved with the aforediscussed expedient of operating the apparatus (and more particularly the drive means for the conveyor 26) in such a way that the conveyor 26 performs so-called idle strokes or steps LTS at required intervals, and each such step LTS involves a movement of the conveyor 26 relative to the conveyor 12 before the conveyor 12 is caused to perform a step ZS, i.e., the pocket 28 which leaves the station 15 is empty because the conveyor 26 has been caused to perform a step TS before the foremost empty pocket 28 has received an array 54 from the adjacent compartment 14 of the conveyor 12. Otherwise stated, the phase or timing of stages ZT of cycles TF varies relative to the cycles AT because, as a rule, the operation of the receiving unit 53 is not synchronized with that of the supplying unit 51. Thus, and referring to the fourth stage ZT of the first cycle TF1, this stage is carried out during the stage AP of the cycle AT1, the fourth stage ZT of the second cycle TF2 is carried out during the first stage AP of the second cycle AT2, but the fourth stage ZT of the third cycle TF3 is carried out during the stage WP of the third cycle TF3. The phase differences increase from cycle to cycle, and each next-following difference equals the sum of preceding differences.

On the other hand, it is desirable to ensure that the transferring device 33 perform a forward and a return stroke during the stage AP of each cycle AT of the receiving unit 53 and that the conveyor 26 complete a step TS during the stage WP of each cycle AT. This ensures that the conveyor 26 can advance successive arrays 54 (when available) into the range of the transferring device 33 and that the receiving unit 53 can convert each such array into a carton which includes a total of ten packets 52 and an adhesive-coated blank 34 which is properly draped around the array so as to confine the packets (these packets have been converted into five constituents 10 of the respective array during gathering of packets at the station 15). The aforediscussed absence of synchronism between the operation of the gathering means 12, 16 and the receiving unit 53 entails that certain pockets 28 of the conveyor 26 are empty at the time such pockets reach the station 30 and the transferring unit 33. This takes place during the third, seventh and tenth cycles AT1, AT3 and AT10 of the receiving unit 53. A full array 54 is ready for delivery into the adjacent empty pocket 28 of the conveyor 26 subsequent to each idle stroke or step LTS of the conveyor 26. In order to avoid the delivery of an adhesive-coated blank 34 to the station 30 when this station receives an empty pocket 28, the path of pockets 28 along the upper reach of the conveyor 26 is monitored by a mechanical, photoelectronic or other suitable detector 46 which causes the control circuit 44 (e.g., a microprocessor) to transmit to the blank supplying device 47 a signal via conductor means 45 whenever the detector 46 signals the presence of an empty pocket 28 in the respective portion of the path for the conveying of arrays 54 from the station 15 to the station 30.

The apparatus further comprises means for ensuring that the conveyor 12 will invariably carry out its steps ZS at a time when the conveyor 26 is at a standstill. This is accomplished by the provision of means for monitoring the timing or phases of selected stages ZT of successive cycles TF of the gathering means 12, 16 and/or by monitoring the frequency of advancement of discrete packets 52 from the supplying unit 51 to the station 15. A determination of the condition of an array 54 at the station 15 must be completed in good time before the conveyor 26 is caused to advance by a step TS in order to make sure that the conveyors 12, 26 will not clash at the locus where their paths cross each other adjacent the platform 18. The monitoring means are designed to ascertain whether or not a step ZS can be completed within a predetermined stage of the respective cycle AT, and such monitoring means comprises two detectors 57, 58 which are installed at the station 15 and each of which transmits signals to a corresponding input of the control circuit 44. It is presently preferred to use at least one of the detectors 57, 58 as a means for monitoring the fourth stage ZT of each cycle TF. The detector 57 transmits to the control circuit 44 a signal whenever the fourth constituent 10 of an array which is in the process of being gathered at the station 15 has reached a predetermined position. To this end, the detector 57 can monitor the path for the stops 19a, 19b of the aligner 19 to generate a signal when the stop 19a or 19b reaches a predetermined portion of its path such as corresponds to the final position of the fourth of five constituents 10 of a fully assembled array 54 in a compartment 14 of the conveyor 12 at the station 15. The detector 58 is designed to monitor the pusher 16 and to generate a signal when the pusher 16 completes the fourth of five successive forward strokes, i.e., when the fourth constituent 10 of a growing array at the station 15 has entered the adjacent compartment 14 of the conveyor 12. The detector 57 can be used in lieu of or in addition to the detector 58. The timing of signals from the detectors 57, 58 is compared with the corresponding portion (phase angle) of the concurrent cycle AT.

When the gathering of a fresh array at the station 15 is completed in good time prior to the next stage WP of the respective cycle AT (note the cycle TF2 in FIG. 4), the conveyor 26 is caused (by the control circuit 44 and motor 38) to perform a step TS so that such step is started and completed after the next step ZS of the conveyor 12 during the stage WP. In order to ensure that the conveyor 26 will be prevented from carrying out a step TS when the conveyor 12 is in motion (i.e., when the conveyor 12 performs a step ZS during the stage WP of the respective cycle AT of the receiving unit 53), the control circuit 44 compares the timing of signals from the detectors 57, 58 (i.e., the timing of introduction of the fourth constituent 10 of the growing array 54 at the station 15) with the elapse of a certain portion (note gamma) of the interval T4+T5 which is taken up by the respective cycle AT of the receiving unit 53. The value of gamma is selected in such a way that there is ample time for completion of the last (fifth) stage ZT of the then running cycle TF as well as for the step ZS of transferring the fully grown array 54 into the adjacent pocket 28 of the then stationary conveyor 26. In addition, the conveyor 26 must thereupon complete the step TS within the stage WP of the respective cycle AT so as to ensure that the conveyor 26 is at a standstill during the stage AP of the next cycle AT. FIG. 4 shows that the conveyor 12 carries out its step ZS during the stage AP of the first cycle AT1 but during the stage WP of the second cycle AT2; nevertheless, the step ZS during the stage WP of the cycle AT2 is completed in good time in order to enable the conveyor 26 to advance by a step TS prior to completion of the cycle AT2. The control circuit 44 ensures that the motor 38 is not started (i.e., the conveyor 26 cannot carry out a step TS) before the conveyor 12 comes to a standstill upon completion of a step ZS. In other words, the circuit 44 can select the timing of the start of a step TS during the stage WP of a cycle AT, as long as the interval T3 for carrying out the step TS does not overlap with the next cycle AT of the receiving unit 53.

Alpha denotes in FIG. 4 the interval between gamma and the end of the respective cycle AT3. Since the fourth stage ZT of the cycle TF3 falls within the interval alpha, the remaining portion of stage WP of the cycle AT3 would not suffice to complete the gathering of the growing array 54, plus the step ZS as well as the step TS within the remaining portion of the cycle AT3. Therefore, the control circuit 44 responds to signals from the detectors 57, 58 in such a way that it causes the conveyor 26 to perform an idle step or stroke LTS before the gathering of the array 54 within the cycle TF3 is completed. Alpha denotes that part of the interval T4+T5 (for a complete cycle AT of the receiving unit 53) which is required to reliably ensure that, if the detectors 57, 58 generate signals in response to completion of four fifths of an array which is being gathered at the station 15, the remaining part of the interval T4+T5 suffices for completion of the array at the station 15, for the conveyor 12 to thereafter carry out a step ZS and for the conveyor 26 to thereafter carry out a step TS and come to a halt before the respective cycle (AT3) is completed. In the apparatus whose operation is represented in the diagram of FIG. 4, alpha equals or exceeds T1+T2+T3.

The conveyor 12 carries out the step ZS after the conveyor 26 has completed the step LTS immediately after completed gathering of the array 54, still during the stage WP of the cycle AT3. This ensures that the freshly gathered or grown array 54 is delivered into the adjacent empty pocket 28 of the conveyor 26, this pocket being separated by an empty pocket 28 from the last of a series of filled pockets 28 on the upper reach of he conveyor 26.

If the fourth stage ZT of the cycle TF3 were completed prior to the portion alpha of the interval T4+T5 which is allotted for the cycle AT3 (this is indicated at 4′ in line a1 of section I of the diagram of FIG. 4), the conversion of two additional packets 52 into the last constituent of the array 54 would have been completed at 5′, the conveyor 12 could have completed a step ZS′, and the conveyor 26 could have completed a step TS′ prior to completion of the cycle AT3. The interval T5 which is required to complete a stage WP at least equals T2+2×T3; therefore, if the conveyor 12 were ready to perform the step ZS′ at the time as indicated in line b1, the remainder of the portion alpha of interval T4+T5 would suffice to complete the step TS′ prior to completion of the cycle AT3. The step LTS is carried out before the step ZS because the portion of stage WP of cycle AT3 between gamma and ZS is longer than T3, i.e., the conveyor 26 can complete its idle stroke or step LTS before the gathering of the array at the station 15 is completed so that the conveyor 26 is again idle when the conveyor 12 is caused to carry out the step ZS immediately or shortly following the step LTS. Such mode of operating the conveyor 26 is desirable and advantageous because the step LTS of advancing an empty pocket 28 from the station 15 during the last stage or stages of gathering an array in the compartment 14 at the station 15 is invariably completed prior to completion of the respective cycle AT3.

As shown in line a1 of the diagram of FIG. 4, the conveyor 12 is caused to carry out a step ZS immediately following or shortly after completion of the step LTS by the conveyor 26, namely as soon as the gathering of the array 54 at the station 15 is completed. All this takes place during the stage WP of the cycle AT3. Thus, the conveyor 26 receives the freshly gathered array (i.e., the array which was gathered during the cycle TF3) before the cycle AT3 is completed, and the conveyor 26 is ready to carry out a step TS during the first part of stage WP of the next-following (fourth) cycle AT4 of the receiving unit 53. This ensures that the array 54 which is gathered during the fourth cycle TF4 of the gathering means 12, 16 can be transferred into the adjacent empty pocket 28 of the conveyor 26 as soon as the gathering of such array is completed.

The cycles AT4, AT5 and AT6 are completed in the same way as the cycles AT1 and AT2, i.e., the conveyor 26 need not perform idle strokes or steps LTS because the fourth stages ZT of the respective cycles TF4 and TF5 are completed in good time prior to elapse of portions gamma of the respective intervals T4+T5. During the cycles AT5 and AT6, the conveyor 26 carries out its steps TS during the respective stages WP. At the same time, the timing of steps ZS which are carried out by the conveyor 12 during the cycles TF4 and TF5 relative to the intervals of cycles AT5 and AT6 varies from cycle to cycle (note the lines b2 and c2).

During the seventh cycle AT7 of the receiving unit 53, the pusher 16 of the gathering means 12, 16 fails to deliver the fifth constituent 10 of the array which is being gathered in a compartment 14 of the conveyor 12 at the station 15. This can be seen in the left-hand portion of line a3. Were the fifth constituent 10 available, the gathering means 12, 16 would have been capable of completing the gathering of a full array 54 during the cycle TF6 in good time (note ZS″) to ensure that the conveyor 26 could have carried out a step (TS″) prior to elapse of the interval T5 for the stage WP of the seventh cycle AT7. However, since at least one of the packets 52 which were to form the fifth constituent 10 of the array being gathered at the station 15 is missing, a monitoring device 43 (FIG. 2) transmits to the control circuit 44 a signal which causes the control circuit to transmit a signal to the motor 38 which causes the conveyor 26 to perform a step LTS before the gathering of growing array 54 at the station 15 is completed and before the conveyor 12 can carry out its step ZS. The control circuit 44 initiates the step LTS at the very start of stage WP of the cycle AT7 so that, when the step LTS is completed, the conveyor 12 can carry out its step ZS prior to expiration of the interval TP for stage WP of the cycle AT7. The monitoring device 43 includes a radiation source 43a at one side and a transducer 43b at the other side of the path of movement of packets 52 with the cleated belt 6 which delivers packets from the source 56 into the range of the elevator 9.

The absence of any other but the fifth component 10 does not influence the operation of the conveyor 26 which performs its steps TS or LTS during the stages WP of successive cycles AT. Thus, the only difference is that, when the fifth constituent 10 is missing, namely when the pusher 16 fails to deliver the last pair of packets 52 while it performs a forward stroke, the circuit 44 causes the conveyor 26 to perform a step LTS in lieu of a step TS, i.e., the last filled pocket 28 on the upper reach of the conveyor 26 is then followed by an empty pocket 28 which has been advanced beyond the station 15 without receiving an array 54 from the conveyor 12.

The cycles AT8 and AT9 are completed in routine fashion, i.e, the making of a step LTS during the cycle LT7 has no effect upon the step TS during the stage WP of the cycle AT8 because the conveyor 12 has completed a step TS during the stage WP of the preceding cycle AT7. A step ZS is carried out during the stage AP of the cycle AT9, and such step is followed by a step TS during the stage WP of the cycle AT9.

During the cycle AT10, the fourth stage ZT of the cycle TF8 is completed after elapse of portion gamma of the interval T4+T5; therefore, the circuit 44 induces the motor 38 to cause the conveyor 26 to carry out a step LTS as soon as the stage WP of the cycle AT10 is completed. Reference may be had to the description of the making of step LTS during the stage WP of the third cycle AT3 of the receiving unit 53. The step ZS of the conveyor 12 (during the cycle TF8) follows the step LTS of the conveyor 26.

It will be seen that the improved apparatus can constitute a direct link or coupling between a receiving unit and a supplying unit even if the output of the supplying unit does not match the requirements of the receiving unit, and that the establishment of such direct link or coupling ensures proper operation of both units without the need for a magazine wherein spare arrays are stored for introduction into empty pockets 28 of the conveyor 26 downstream of the first station 15. All that is necessary is to ensure that, if the output of the supplying unit 51 does not match the requirements of the receiving unit 53, the requirements of the receiving unit 53 exceed the output of the supplying unit 51 and that the controls of the apparatus be designed to initiate the making of idle strokes or steps LTS whenever the gathering of an array 54 at the station 15 and the delivery of such array into an empty pocket 28 cannot be carried out prior to completion of the respective cycle AT of the receiving unit 53. This necessitates a monitoring of timing of selected (e.g., fourth) stages ZT of the cycles TF of gathering means 12, 19 relative to the cycles AT of the receiving unit 53.

The value of gamma can be selected by a source 59 of reference signals (FIG. 2) which is connected with an input of the control circuit 44. This value depends primarily on the selection of that stage ZT whose timing relative to the cycles AT is to be monitored by the detector 57 and/or 58. Thus, the value of gamma will be changed if the controls are set up in such a way that the detectors 57, 58 transmit signals in response to detection of third, second or other constituents 10 of arrays 54 which are being gathered at the station 15. The selected stage ZT determines the length of that interval which must elapse in order to complete the gathering of an array and the transfer of such array into a pocket 28. The just mentioned interval is longer if the detectors 57, 58 monitor the third or second constituent 10 of the growing array at the station 15 because the completion of an array then requires two or three additional stages ZT.

The monitoring device 46 is adjacent the path of movement of pockets 28 from the station 15 toward the station 30. As explained above, the purpose of this monitoring device is to transmit signals in response to detection of empty pockets 28 in a predetermined portion of such path so that the control circuit 44 can transmit a signal via conductor means 45 in order to prevent the device 47 from supplying a blank 34 to the station 30 when such station accommodates the detected empty pocket 28. The connection between the control circuit 44 and the blank supplying device 47 ensures that the receiving unit 53 is not clogged with unused blanks and that unused blanks 34 (portions of which are normally coated with adhesive not later than upon arrival at the station 30) cannot adhere to parts of the receiving unit 53 and/or to the transferring device 33.

If a cycle AT of the receiving unit 53 is assumed to cover an angle of 360 degrees, gamma denotes the limit which should not be exceeded at the completion of the fourth stage ZT of a cycle TF of the gathering means 12, 16, and alpha denotes the angle which is required upon completion of the fourth stage ZT of a cycle TF in order to complete the fifth stage ZT, to thereupon carry out the delivering step ZS and to thereupon carry out the conveying step TS prior to completion of the respective cycle AT. The conveyor 26 carries out a step LTS if the limit gamma is exceeded, i.e., if at least a portion of the fourth stage ZT of a cycle TF falls within the angle alpha of the circle representing a cycle AT.

An important advantage of the improved method and apparatus is that the conveyor 26 can be caused to carry out its steps TS during different parts of stages WP of the respective working cycles AT of the receiving unit 53. This enhances the flexibility of the apparatus and renders it possible to account for shifts (if any) in timing of the completion of cycles TF relative to the cycles AT without the need for magazines adjacent the path of movement of arrays 54 from the gathering station 15 toward the second station 30. The control circuit 44 regulates the start of successive steps TS in dependency on the relationship of timing of the fourth stages ZT of successive cycles TF of the gathering means 12, 16 relative to the cycles AT of the receiving unit 53. Thus, and as already explained above, a step TS is not carried out automatically at the start of each stage WP but is caused to take place in dependency on the timing of the fourth stage ZT of the respective cycle TF. This renders it possible to take advantage of the entire interval T5 because the step TS can begin at the start or during a later part of such interval, as long as it can be completed prior to start of the next cycle AT. Such flexibility of the improved method and apparatus contributes significantly to the ability to compensate for rather pronounced fluctuations of timing of fourth stages ZT of successive cycles TF from cycle to cycle of the receiving unit 53. Selection of the fourth stage ZT of each cycle TF by the detectors 57, 58 has been found to be particularly advantageous because it is very simple to ascertain whether or not the next and last stage ZT can be completed within a stage WP of the concurrent cycle AT while still leaving ample time for carrying out the step TS. Alternatively, the circuit 44 causes the conveyor 26 to perform an idle stroke or step LTS which involves a movement of an empty pocket 28 away from the position of register with that compartment 14 of the conveyor 12 which is in the process of gathering an array 54. In other words, the conveyor 26 then performs two successive steps (TS and LTS) without receiving at 15 an array 54 during the interval which elapses between such steps. The selected value of gamma determines whether or not the conveyor 26 will be caused to carry out a step LTS, i.e., whether or not the fourth stage ZT of a cycle TF can be completed in good time before the interval for carrying out a step TS within the respective stage WP begins.

The feature that each step ZS of the conveyor 12 immediately follows completion of an array 54 also contributes to flexibility and versatility of the improved method and apparatus. The same holds true for the feature that the control circuit 44 is responsive to signals from the detector 43 to ensure that the conveyor 26 carries out a step LTS whenever the detector 43 transmits a signal denoting that an article 52 is missing in the path between the source 56 and the turret or duct 8. This ensures that the arrays 54 which are carried by the upper reach of the conveyor 26 can be advanced by a step so that the foremost array 54 reaches the station 30 and can be transferred into the receiving unit 53 in response to the next forward stroke of the transferring device 33.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of transporting articles from a supplying unit to a receiving unit which carries out successive multiple stage working cycles at a predetermined frequency without synchronization of the two units, comprising the steps of advancing articles from the supplying unit to a first station; monitoring the relationship of timing of said advancing steps with reference to the cycles of the receiving unit; gathering predetermined numbers of said advanced articles into a series of arrays of articles at the first station; conveying the arrays of said series from the first station toward a second station during different portions of first stages of successive cycles of the receiving units as a function of the monitored relationship; and transferring discrete arrays from the second station to the receiving unit during second stages of successive cycles of the receiving unit.

2. The method of claim 1, wherein said gathering steps are carried out at a second frequency which at most equals said predetermined frequency, said conveying steps include transporting the arrays during the first stage of each cycle irrespective of whether or not the conveying step results in the delivery of an array to the second station.

3. The method of claim 1, wherein each gathering step takes up an interval of time involving the conversion of said predetermined number of articles into constituents of the respective array, said monitoring step including monitoring the conversion of selected articles of each predetermined number of articles into the corresponding constituent of the respective array.

4. The method of claim 3, wherein said monitoring step includes monitoring the conversion of penultimate articles of said predetermined numbers of articles into the corresponding constituents of the respective arrays.

5. The method of claim 4, wherein said conveying steps include transporting the arrays relative to the articles which are in the process of being gathered at the first station when the conversion of the penultimate article of a predetermined number of articles into a constituent of the array which is being gathered at the first station coincides with a predetermined portion of the respective cycle.

6. The method of claim 1, wherein a conveying step is carried out during the first stage of each of said cycles.

7. The method of claim 1, wherein each conveying step includes transporting arrays from the first station toward the second station in the pockets of a conveyor, and further comprising the step of delivering arrays from the first station into the pockets of the conveyor.

8. The method of claim 7, wherein each delivering step immediately follows completion of a gathering step.

9. The method of claim 7, further comprising the step of monitoring the timing of conversion of selected articles of said predetermined numbers into constituents of the respective arrays relative to the respective cycles, each conveying step including transporting the arrays relative to the articles which are in the process of being gathered into an array at the first station when the monitored timing is outside of a predetermined portion of the respective cycle.

10. The method of claim 9, wherein each cycle includes said predetermined portion and a second portion following the predetermined portion an involving an interval of time which is required for completion of the array at the first station and delivery of completed array into a pocket of the conveyor.

11. The method of claim 1, wherein said advancing step includes transporting articles along a predetermined path, and further comprising the step of monitoring said path for the presence of articles therein, said conveying step including transporting the arrays relative to the articles which are being gathered into an array at the first station when the path monitoring step indicates the absence of articles in said path.

12. Apparatus for transporting articles from a supplying unit to a receiving unit which carries out successive multiple stage working cycles at a predetermined first frequency without synchronization of the two units, comprising means defining a first station and a second station remote from said first station; means for advancing articles to said first station; means for gathering predetermined numbers of advanced articles into a series of arrays at the first station at a second frequency; signal generating means for monitoring said second frequency; intermittently operated conveyor means for advancing said series of arrays from the first station toward the second station during different portions of first stages of successive cycles of the receiving unit; drive means for said conveyor means; control means for starting said drive means in response to signals from said monitoring means; and means for transferring discrete arrays from said second station to the receiving unit during second stages of said cycles.

13. The apparatus of claim 12, wherein said first frequency equals or exceeds said second frequency, and further comprising means for driving said conveyor means during the first stage of each cycle of the receiving unit so that said conveyor means advances at times relative to the articles which are being gathered into an array at the first station when the first frequency exceeds the second frequency.

14. The apparatus of claim 12, wherein said monitoring means includes means for generating signals in response to detection of penultimate articles of successive predetermined numbers of articles which are in the process of being gathered into an array at said first station, said drive means being arranged to mover said conveyor means by a step relative to the articles which are in the process of being gathered into an array at the first station when said monitoring means generates a signal during a predetermined portion of the respective cycle.

15. The apparatus of claim 14, wherein said control means includes a source of reference signals denoting said predetermined portions of said cycles.

16. The apparatus of claim 12, wherein said conveyor means includes an endless conveyor having pockets for discrete arrays.

17. The apparatus of claim 19, wherein said gathering means includes second conveyor means for articles which are gathered into arrays and means for driving said second conveyor means so as to deliver successively gathered arrays into the pockets of said endless conveyor prior to stepwise advancement of arrays by said endless conveyor.

18. The apparatus of claim 17, wherein said monitoring means includes means for monitoring the timing of conversion of a selected article of each predetermined number of articles into a constituent of an array at said first station, said control means being arranged to operate said drive means upon completed delivery of an array into a pocket of said endless conveyor in response to signals from said monitoring means when the conversion is completed within a predetermined portion of the respective cycle, said control means including means for selecting said predetermined portions of cycles and being further arranged to operate said drive means so as to move said endless conveyor relative to the array which is in the process of being gathered at the first station when the signal from said monitoring means indicates that the conversion of selected articles of a predetermined number of articles is not completed within said predetermined portion of the respective cycle.

19. The apparatus of claim 17, further comprising means for monitoring said advancing means and for generating signals in response to detected absence of an article, drive means for said endless conveyor, and control means arranged to operate said drive means so as to move said endless conveyor by a step relative to said second conveyor means prior to delivery of an array into a pocket of said endless conveyor when said monitoring means generates a signal.

20. The apparatus of claim 12, wherein said receiving unit includes a wrapping machine for arrays.

21. The apparatus of claim 12, wherein the articles include packets of smokers' products and the supplying unit includes a machine for draping packets into light-transmitting envelopes.

22. The apparatus of claim 21, wherein said gathering means includes means for gathering pairs of packets into said series of successive arrays.

23. The apparatus of claim 22, wherein said receiving unit includes a cartoner.

* * * * *